J. WEBER, Jr.
COLLAPSIBLE CART.
APPLICATION FILED AUG. 19, 1907.
972,740.
Patented Oct. 11, 1910.
2 SHEETS—SHEET 1.
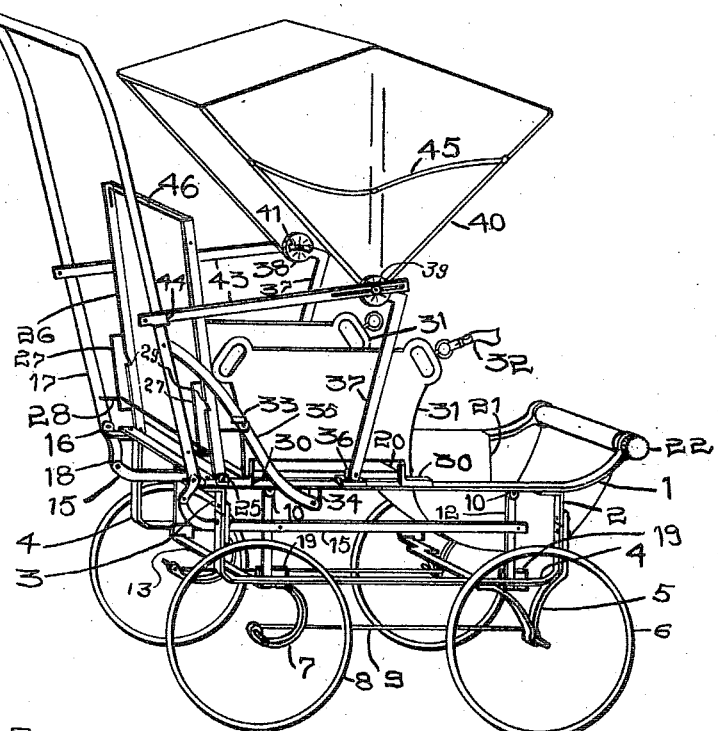

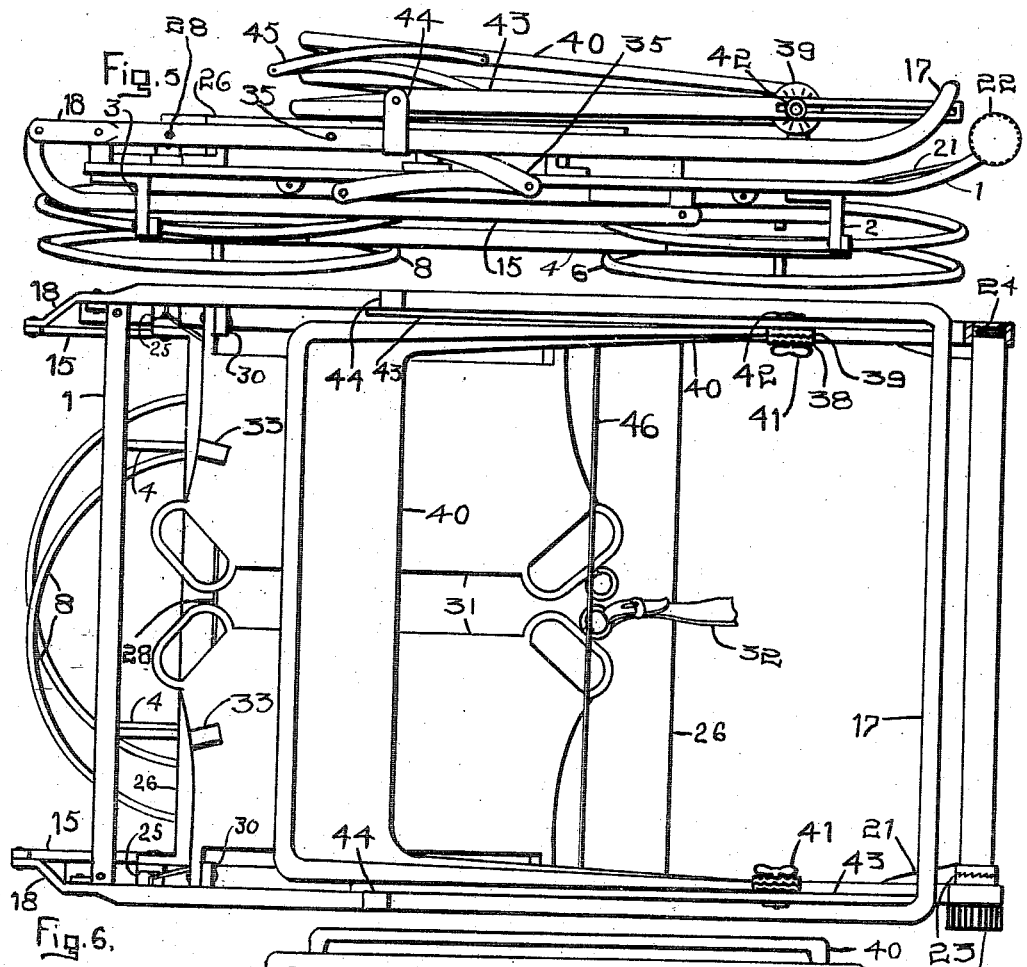

UNITED STATES PATENT OFFICE.

JOHN WEBER, JR., OF TOLEDO, OHIO, ASSIGNOR TO THE TOLEDO METAL WHEEL COMPANY, OF TOLEDO, OHIO, A CORPORATION OF OHIO.

COLLAPSIBLE CART.

972,740.

Specification of Letters Patent. Patented Oct. 11, 1910.

Application filed August 19, 1907. Serial No. 389,109.

*To all whom it may concern:*

Be it known that I, JOHN WEBER, Jr., a citizen of the United States, residing at Toledo, in the county of Lucas and State of Ohio, have invented a new and useful Collapsible Cart, of which the following is a specification.

This invention relates to a body having certain foldable elements capable of being quickly opened out to form a rigid construction.

This invention has utility when embodied in a vehicle designed for ready knocking down into a minimum of space for convenient handling in a most compact shape, and also for quick setting up in the form of a stiff, easily propelled running gear with comfortable easy riding carriage body.

Referring to the drawings: Figure 1 is a perspective view of an embodiment of the invention in a child's carriage of the English go-cart type; Fig. 2 is a fragmentary perspective view of the swinging locks for the hinged wheel carrying side frames of the running gear; Fig. 3 is a side elevation of a hinged side frame without the wheels; Fig. 4 is a bottom plan view of the relatively movable wheel carrying member mounted in side frame shown in Fig. 3; Fig. 5 is a side elevation of the vehicle in folded or collapsed state; Fig. 6 is a plan in the same folded condition; Fig. 7 is an end view in the same knocked down state, a portion of fabric bottom being torn away; and Fig. 8 is an enlarged fragmentary elevation of the bottom adjusting means.

Carried by body 1 are brackets 2, 3, to which are pivoted hinged side frame 4. A side frame 4 is along each side of the vehicle, and these frames are hung parallel to each other. At the forward end of each frame is a bracket 5 adjacent which is wheel 6, while near the rear portion of each frame 4 is a spring bracket 7 adjacent to which is wheel 8. Extending through a bracket 5 and a bracket 7, as well as affording an axle for a wheel 6 and a wheel 8, is wheel carrying member or rod 9, which serves to keep the wheels on each side positively spaced and alined in a common plane, while also permitting spring operation of bracket 7.

Mounted on body 1, intermediate brackets 2, 3, are brackets 10, to the forward pair of which is pivoted swinging locking brace 12, the medially bent portion of which may swing up between the side rails of body 1 thus permitting a closer folding in of the wheel carrying hinged side frames. To the rear pair of brackets 10 is pivoted swinging brace member 13. Links or elements 14 connect the locking members or elements 12, 13, to side bars or links 15.

On the rear portion of body 1 are brackets 16 to which is pivoted the handle or vehicle directing member 17, having at its lower end inwardly curved extensions 18 which engage bars 15, so that as the handle 17 is swung into position as a pusher bar for the carriage, the bars 15, force the locking members 12, 13, downward to throw the side frames 4 laterally, the locking members moving into position in hook stops or locks 19 to positively prevent any wobbling of the frames 4.

Rigidly fixed in the after portion of the body is the seat 20, while forwardly the flexibly bottom portion 21 serves for the child's foot rest. This portion 21, by rotation of knurled head 22 may adjust this dash or foot portion, for instance by drawing up to a taut position as shown in Fig. 5, desirable for very small children or to place in reclining position. By rotation of head 22, the winding may be accomplished, forcing the front bar against resistance of spring 24 as the rotation occurs past teeth 23 which latter thus serve to lock or hold the flexible bottom in adjusted position, the spring making the locking action automatic. To unwind, the head 22 is pushed in to free the teeth 23. In varying the size of the body, release of head 22, is at once followed by the self locking in such adjusted position.

On the body 1, forward of brackets 16, are brackets 25, to which is pivoted the back 26 of the carriage. On the rear of the back near each side is a wire 27 forming a slot or loop, through each of which extends wire or rod 28 which is pivoted to handle 17. With the rod 28 resting against the back at the bottom of loops formed by rods 27, the back is held adjusted in a position but slightly inclined rearwardly, for comfortable setting up attitude for child. With rod 28 at other extreme position in the loops, the back is nearly horizontal, suitable for reclining position. Should intermediate adjustments for the back be desired, notches 29 may be formed for engagement by rod 28.

Adjacent the front and rear portions of the seat 20, there is mounted on body 1, brackets 30, to which are pivoted sides 31 for the carriage seat. To hold the child in the seat, strap 32 may be provided. On the outer portion near the rear of each side 31 is a hook or lock 33. On the body 1, between brackets 30, are placed brackets 34, with which jointed brace 35 is connected and pivoted to directing member 17. In movement of these braces 35 to lock the handle 17, they move into position in the locks 33 and so hold the seat sides firmly in position.

Between brackets 34 and forward brackets 30, brackets 36 are fixed to body 1. Pivoted to these brackets are links 37 which have angular extensions 38, forming circular and corrugated clamp members. A corresponding clamp member 39 is at each side of folding hood or top 40, so that by operation of thumb screw 41, button 42 may be drawn to clamp the hood at any desired position of adjustment in slot of links 43, either by tilting the hood forward or back, or moving to forward or rearward positions of slots. Links 43 are connected to brackets 44 fixed to handle 17. The jointed brace 45 provides means for firmly holding the hood extended or for collapsing.

Operation: To knock down or collapse the vehicle from set up position shown in Fig. 1, the hood braces 45 are pulled upward to fold the hood. Then loosening of thumb screws 41 permits the hood to fall back toward handle 17. Pulling of handle locking braces 35 forward, allows the handle to move forward, folding back 26 on to seat 20, the sides 31 folding inward, while simultaneously links 43 have been folding the hood mounting links 37 so that hood rests compactly against the sides 31, and bars 15 have unlocked side frames 4. The vehicle is thus left standing. Tilting of it over, folding in either side first, brings the wheels up close against the body, and the collapsing is completed. The elements 14, 15, due to their assembled relation and connection to operate the brace members, allow of a most compact folding of the structure. To set up, move the handle 17 away from the dash. Through extensions 18 and bars 15, the side frames are forced outward by members 12, 13, which move into locks 19 to firmly hold. Links 43 of the top mounting, pull the hood up. Rod or link 28 brings the back 26 up and the overlying sides 31 come into position first. All these actions result from merely moving the handle and all occur simultaneously. Movement of braces 35 to lock handle 17 locks sides 31, and the top 40 may be left down or adjusted as found desirable. The simplicity of the construction permits of performance of these operations with great facility.

The vehicle produced is light, most substantial, and yet is complete in its appointments as to comfort of occupant. The stiff frames for the seat back and sides permit of upholstering so that there is no forcing of the child into an uncomfortable position and annoying by jolting against supporting rails. Adding to this the action of springs 7, and the perfection of the novel and useful features hereof produce a most desirable go-cart.

In folding the cart, when the back 26 is down against the seat 20, the seat sides 31 folded in, then holding means or bail rod 46, pivoted to the sides of the back near its upper end and frictionally engaging the sides of the back, may be swung from the position in Fig. 1 near top of back, to position in Fig. 6, thus keeping the seat sides in position. The frictional engagement of rod 46 with back 26 is sufficient to retain it in position to which moved. In unfolding cart, bail 46 is swung toward top of back to release seat sides and thereby permit movement of handle 17 to set up the cart.

What is claimed and it is desired to secure by Letters Patent is:

1. A vehicle having a body provided with a seat, a bottom portion adjustable independently of the seat, and a roller for adjusting the bottom.

2. A vehicle having a body provided with back and bottom portions, and a self-locking adjustable roller for varying the size of the bottom independently of the back.

3. A vehicle having a body provided with a seat, inwardly folding seat sides, a pivoted vehicle directing member, and member and seat side locking links directly coacting between the body, member and sides to lock in set-up position.

4. A vehicle comprising a body, a pivoted wheel carrying frame mounted on each side of the body to fold beneath the body, wheels mounted in said frame, a brace member pivoted to the body and movable to engage the frames and hold said frames in unfolded position, a pivoted directing member for the vehicle mounted on the body and extending rearwardly of the vehicle, and a connection between the directing member and the brace member, said connection including an element pivotally connected to and extending forwardly from the directing member, an element connected to the brace member and extending toward the forward end of the vehicle when the vehicle is in set up position, and intermediate engaging means operatively connecting the elements to permit actuation of the brace member from the directing member and allowing folding of the brace member and one of said elements into different planes.

5. A vehicle comprising a body, a pair of pivoted wheel carrying frames mounted on the body and adapted to fold beneath the body, wheels mounted in said frames, forward and rear brace members pivoted to the body and movable to hold the frames in unfolded position, a directing member for the vehicle pivoted to the body and extending rearwardly of the vehicle, and link connecting mechanism between the directing member and brace members, said mechanism including an element connected to one of the brace members and extending toward the forward end of the vehicle when the vehicle is in set up position, an element pivotally connected to and extending forwardly from the directing member, and intermediate engaging means operatively connecting said elements and allowing folding of the brace member and one of said elements into different planes, said mechanism engaging the other brace member to effect simultaneous throw of said brace members from said directing member.

6. A vehicle comprising a body, wheel carrying frames pivoted to the body, said frames adapted to fold beneath the body, wheels mounted in said frames, a brace member pivoted to the body and movable to hold the frames in unfolded position, a directing member for the vehicle pivoted to the body and extending rearwardly of the vehicle, link connecting mechanism between the brace member and the directing member including an element pivotally engaging the directing member and forwardly extending therefrom, an element extending toward the forward end of the vehicle when the vehicle is in set up position, said element engaging the bracing member, and intermediate engaging means pivotally connecting said elements and allowing folding of the brace member and one of said elements into different planes, whereby movement of the directing member may actuate the brace member to unfold the wheel carrying frames, and a lock device comprising pivoted elements connected to be thrown into locking position by said unfolding movement to hold the brace member and directing member in unfolded position.

7. A vehicle comprising a body, parallel side frames hinged to the body, a plurality of bracing members for the side frames, a directing member pivoted to the body and extending rearwardly of the vehicle, and link connecting mechanism for simultaneously throwing the bracing members from the directing member, said mechanism including an element pivotally connected to and forwardly extending from the directing member, elements engaging each of the bracing members and extending toward the forward end of the vehicle from the bracing members, and intermediate engaging means pivotally connecting said elements and allowing folding of the brace members and one of said elements into different planes.

8. A vehicle comprising a body, wheel carrying frames, a directing member, and forward and rear brace members pivotally mounted on the body, and link connecting mechanism between the members, said mechanism including an element extending longitudinally of the vehicle when the vehicle is in set up position, said element connected to one of the brace members, a forwardly extending element pivotally connected to the directing member, and an intermediate pivotal connection between said elements whereby movement of the directing member may throw the brace members and allowing folding of the brace members and one of said elements into different planes.

In testimony whereof I affix my signature in the presence of two witnesses.

JOHN WEBER, Jr.

Witnesses:
  Geo. E. Kirk,
  G. W. Graham.

It is hereby certified that in Letters Patent No. 972,740, granted October 11, 1910, upon the application of John Weber, jr., of Toledo, Ohio, for an improvement in "Collapsible Carts," errors appear in the printed specification requiring correction as follows: Page 3, line 16, the word "member" should read *members;* same page, line 79, the word "members" should read *member;* and that the said Letters Patent should be read with these corrections therein that the same may conform to the record of the case in the Patent Office.

Signed and sealed this 1st day of November, A. D., 1910.

[SEAL.]

E. B. MOORE,
*Commissioner of Patents.*